United States Patent
Chittimalli et al.

(10) Patent No.: US 10,885,442 B2
(45) Date of Patent: Jan. 5, 2021

(54) METHOD AND SYSTEM TO MINE RULE INTENTS FROM DOCUMENTS

(71) Applicant: Tata Consultancy Services Limited, Mumbai (IN)

(72) Inventors: Pavan Kumar Chittimalli, Pune (IN); Ravindra Naik, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 127 days.

(21) Appl. No.: 16/265,965

(22) Filed: Feb. 1, 2019

(65) Prior Publication Data
US 2019/0244116 A1    Aug. 8, 2019

Related U.S. Application Data

(60) Provisional application No. 62/625,703, filed on Feb. 2, 2018.

(51) Int. Cl.
*G06F 40/30* (2020.01)
*G06F 40/205* (2020.01)
*G06N 5/02* (2006.01)
*G06F 40/289* (2020.01)

(52) U.S. Cl.
CPC .......... *G06N 5/025* (2013.01); *G06F 40/205* (2020.01); *G06F 40/289* (2020.01); *G06F 40/30* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 6,006,242 A | * | 12/1999 | Poole | G06F 40/221 715/209 |
| 8,935,654 B2 | * | 1/2015 | Sengupta | G06F 11/3684 717/101 |
| 10,354,188 B2 | * | 7/2019 | Chalabi | G06N 5/022 |

(Continued)

OTHER PUBLICATIONS

Bajwa, I.S. et al. "SBVR Business Rules Generation from Natural Language Specification," *AAAI 2011 Spring Symposium Series*, Stanford University, CA, Mar. 21-23, 2011; pp. 1-8.

(Continued)

*Primary Examiner* — Lamont M Spooner
(74) *Attorney, Agent, or Firm* — Finnegan, Henderson, Farabow, Garrett & Dunner LLP

(57) ABSTRACT

A system and method for method and a system for mining rule intents from documents is provided, wherein the rule intents are basic atomic facts present in a sentence. The proposed method and system for mining of rule intents from documents is performed in multiple stages that include extraction of rule sentences from input documents that are further parsed to create dependency trees. The created dependency trees are further analyzing based on a set of plurality of heuristic rules to mine rule intents. The mined rule intents are saved and further displayed in Semantics of Business Vocabulary and Rules (SBVR) format. The mined rule intents that are displayed automatically in the SBVR format can be easily analyzed as they SBVR is a comprehensive standard for business rule representation by Object Management Group (OMG) in accordance with set of a standard pre-defined vocabularies.

9 Claims, 7 Drawing Sheets

(56) References Cited

U.S. PATENT DOCUMENTS

| | | | | |
|---|---|---|---|---|
| 2002/0087515 | A1* | 7/2002 | Swannack | G06F 16/951 |
| 2004/0083092 | A1* | 4/2004 | Valles | G06F 40/30 704/9 |
| 2013/0006608 | A1* | 1/2013 | Dehors | G06F 8/41 704/9 |
| 2013/0073571 | A1* | 3/2013 | Coulet | G06F 40/30 707/755 |
| 2013/0185056 | A1* | 7/2013 | Ingram | G06F 40/40 704/9 |
| 2014/0108071 | A1* | 4/2014 | Boaz | G06Q 10/063 705/7.11 |
| 2014/0244241 | A1 | 8/2014 | Ghaisas et al. | |
| 2016/0140210 | A1* | 5/2016 | Pendyala | G06Q 50/18 707/737 |
| 2016/0148159 | A1* | 5/2016 | Coffing | G06Q 10/10 705/301 |
| 2017/0286489 | A1* | 10/2017 | Dantressangle | G06F 16/22 |
| 2018/0039695 | A1* | 2/2018 | Chalabi | G06N 5/022 |
| 2019/0034417 | A1* | 1/2019 | On | G06N 20/00 |

OTHER PUBLICATIONS

Skersys, T. et al. (Jun. 2014). "Extracting Business Vocabularies from Business Process Models: SVBR and BPMN Standards-based Approach," *Computer Science and Information Systems*, vol. 11, No. 4; pp. 1515-1535.

Angeli, G. et al. "Leveraging Linguistic Structure for Open Domain Information Extraction," *Proceedings of the 53$^{rd}$ Annual Meeting of the Association for Computational Linguistics and the 7$^{th}$ International Joint Conference on Natural Language Processing (vol. 1: Long Papers)*, Beijing, China, Jul. 2015; 11 pages.

* cited by examiner

...bank fails to furnish information on the remitter (with dependency labels: nsubj, xcomp, dobj, prep_on)

FIG. 4B

METHOD AND SYSTEM TO MINE RULE INTENTS FROM DOCUMENTS

CROSS-REFERENCE TO RELATED APPLICATIONS AND PRIORITY

The present application claims priority to U.S. Non-Provisional Patent Application No. 62/625,703, filed on Feb. 2, 2018.

TECHNICAL FIELD

The disclosure herein generally relates to field of data mining and, more particularly, to a method and system for mining rule intents from documents.

BACKGROUND

Organizations follow certain rules to perform various activities or to perform various services. These services or activities performed by the organizations based on a set of rules or business rule. Hence the business rules is the core of the implementation within an organization.

The rules are created or designed by business analysts. The business analysts design the rules according to the needs of the business and by considering various constrains, regulations and policy guidelines as defined by the organization and government authorities. The rules that are created are further documented in natural language and are available as manuals, user guides, requirements documents, terms and conditions and so on.

The rules or business rules are backbone of organizations as they provide the guidelines for various business services and hence have to be extracted and analyzed. The business documents that contain the rules are usually very large, contain several rules along with lot of noise, as they are written in natural language. Hence meaningful manual extraction of business rules from the business documents is a difficult activity. Further if the extracted rules if expressed yet again in natural language, are not always easy for humans to comprehend and analyze for inconsistencies.

The existing extraction or text mining techniques focuses on predictive classification or populating a database or search index with extracted information wherein these existing techniques focus on specific kind or class of documents and take advantage of the structure and format of the document, by using a predefined template. However issues such as eliminating noise, identifying rule sentences in the structured/unstructured documents, extracting rule intents from sentences, extracting relationship among the rule intents and creating their formal representations are still challenging and are yet to be addressed in an explicit manner.

SUMMARY

Embodiments of the present disclosure present technological improvements as solutions to one or more of the above-mentioned technical problems recognized by the inventors in conventional systems. For example, in one embodiment, a method and a system for mining rule intents from documents, wherein the rule intents are basic atomic facts present in a sentence. The proposed method and system for mining of rule intents from documents is performed in multiple stages that include analyzing dependency trees of plurality sentences of input documents based on a set of plurality of heuristic rules. The mined rule intents are saved and further displayed in Semantics of Business Vocabulary and Rules (SBVR) format. The mined rule intents that are displayed automatically in the SBVR format can be easily analyzed as they SBVR is a comprehensive standard for business rule representation by Object Management Group (OMG) in accordance with set of a standard pre-defined vocabularies.

In another aspect, a method for mining rule intents from documents is provided. The method includes extracting a plurality of sentences from the documents as an input, wherein the documents comprises of the plurality of input sentences are structured or unstructured documents that is written in natural language and contains noise. Further the method includes creating a dependency tree for each of the received plurality of sentences, wherein the dependency tree is created for each of the plurality of sentences based on parser techniques that includes Stanford Dependency Parser. Furthermore the method includes extracting a plurality of arguments from the dependency tree based on a plurality of heuristic rules, wherein the plurality of arguments comprise of multiple attributes including value and role attributes. Further the method includes analyzing the extracted plurality of arguments to mine rule intents wherein the rule intents are mined using extracted plurality of arguments (A) along with multiple parameters that include string (S) and headword (H) parameters and finally the method includes saving the mined rule intents in a rule-base database, wherein the mined rule intents are saved in Semantics of Business Vocabulary and Rules (SBVR) format.

In another aspect, a system for mining rule intents from documents is provided. The system comprises a memory storing instructions and a centralized database, one or more communication interfaces; and one or more hardware processors coupled to the memory via the one or more communication interfaces, wherein the one or more hardware processors are configured by instructions for extracting a plurality of sentences from the documents as an input in a rule sentence extractor. The system further includes a natural language parser for creating a dependency tree for each of the extracted plurality of rule sentence. The system further includes a rule intent extractor for extracting a plurality of arguments from the dependency tree based on a plurality of heuristic rules and analyzing the extracted plurality of arguments to mine rule intents and finally the system includes a rule-base database saving the mined rule intents; and a display module for displaying saved mined rule intents.

Another embodiment provides one or more non-transitory machine readable information storage mediums comprising one or more instructions which when executed by one or more hardware processors causes mining rule intents from documents, wherein the program includes extracting a plurality of sentences from the documents as an input, wherein the documents comprises of the plurality of input sentences are structured or unstructured documents that is written in natural language and contains noise. Further the program includes creating a dependency tree for each of the received plurality of sentences, wherein the dependency tree is created for each of the plurality of sentences based on parser techniques that includes Stanford Dependency Parser. Furthermore the program includes extracting a plurality of arguments from the dependency tree based on a plurality of heuristic rules, wherein the plurality of arguments comprise of multiple attributes including value and role attributes. Further the program includes analyzing the extracted plurality of arguments to mine rule intents wherein the rule intents are mined using extracted plurality of arguments (A)

along with multiple parameters that include string (S) and headword (H) parameters and finally the program includes saving the mined rule intents in a rule-base database, wherein the mined rule intents are saved in Semantics of Business Vocabulary and Rules (SBVR) format.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A, FIG. 4B, FIG. 4C and FIG. 4D illustrate use case examples, wherein the dependency tree of extracted rule sentences $rs_1$, $rs_2$, $rs_3$ and $rs_4$ respectively, along with various extracted plurality of arguments, according to an embodiment of present disclosure; and It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Figure 1:
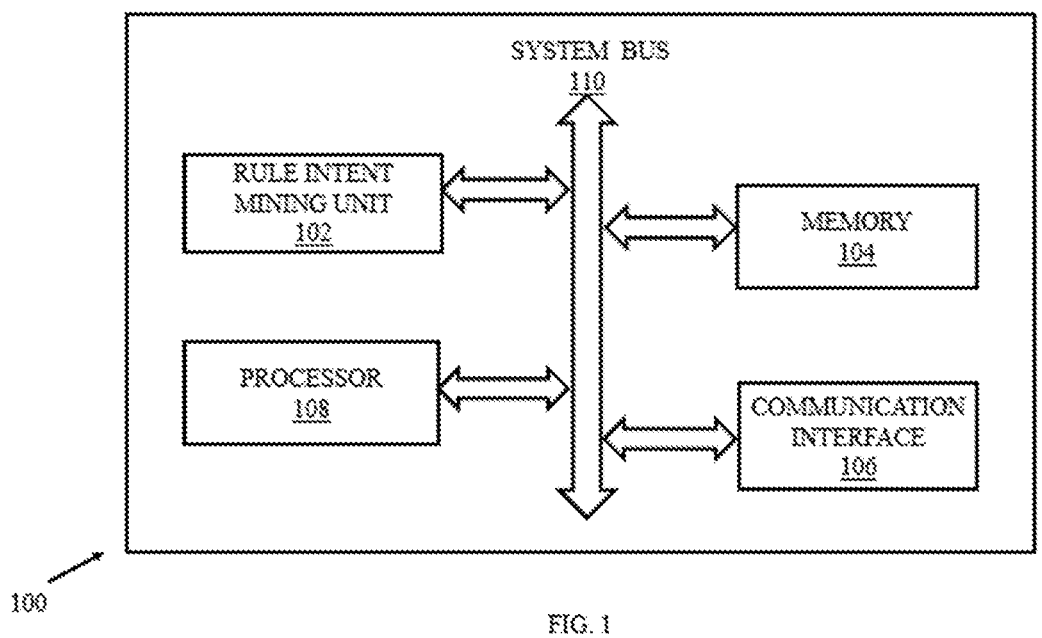
FIG. 1 illustrates an overview of an exemplary system for mining rule intents from documents, according to an embodiment of present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and a system for mining rule intents from documents, wherein the rule intents are basic atomic facts present in a sentence. The proposed method and system for mining of rule intents from documents is performed in multiple stages that include analyzing dependency trees of plurality sentences of input documents based on a set of plurality of heuristic rules. The mined rule intents are saved and further displayed in Semantics of Business Vocabulary and Rules (SBVR) format. The mined rule intents that are displayed automatically in the SBVR format can be easily analyzed as they SBVR is a comprehensive standard for business rule representation by Object Management Group (OMG) in accordance with set of a standard pre-defined vocabularies.

Rule intents are the basic atomic facts present in a rule sentence, wherein a rule sentence is any sentence without noise. The proposed method and system for mining of rule intents from documents is based on analyzing dependency trees of rule sentence (extracted from input documents) based on a set of plurality of heuristic rules of groups, and is formally expressed as shown below;

$$\text{Rule intent}(ri) = (S, H, A)$$

Where
S is the string representing the predicate of the intent.
H is the head word, which is the main word of the dependency tree.
A is the collections of arguments.

The argument (A) is extracted from corresponding dependency tree of rule sentence based on proposed plurality of heuristic rules. An argument (A) comprises of comprise of multiple attributes including value and role attributes wherein a role attribute captures association of an attribute with the concerned rule intent and can hold multiple values such as subject, object, pSubject (prepositional subject), pObject (prepositional object), objective (when a rule intent become argument to another then the role of the previous one is marked as argument).

Further dependency tree are defined by several parameters such as 'p' denotes a parent node, 'c' which denotes a child node, 'gp' that denotes grand-parent node, an edge between 'p' and 'c' is expressed as edgename(p,c). Considering an example, nsubj(p,c) denotes an edge from p (governor) to c(dependent) labelled nsubj. Further string value of a node (n) in dependency tree using word attribute is expressed as (n:word).

Referring now to the drawings, and more particularly to FIG. 1 through FIG. 4D, where similar reference characters denote corresponding features consistently throughout the figures, there are shown preferred embodiments and these embodiments are described in the context of the following exemplary system and/or method.

FIG. 1 is a block diagram of a system 100 for mining rule intents from documents, in accordance with an example embodiment. The system 100 includes a rule intent mining unit 102 for mining rule intents from documents. The rule intent mining unit 102 includes or is otherwise in communication with a memory 104, a communication interface 106, and a processor 108. The memory 104, communication interface 106, and the processor 108 may be coupled by a system bus 110 or a similar mechanism. Although FIG. 1 shows example components of rule intent mining unit 102, in other implementations, system 100 may contain fewer components, additional components, different components, or differently arranged components than depicted in FIG. 1.

The processor 108 may be implemented as one or more microprocessors, microcomputers, microcontrollers, digital signal processors, central processing units, state machines, logic circuitries, and/or any devices that facilitates in designing polymeric carrier for controlled release of molecules. Further, the processor 108 may comprise a multi-core architecture. Among other capabilities, the processor 108 is configured to fetch and execute computer-readable instructions or modules stored in the memory 104. The processor 108 may include circuitry implementing, among others, audio and logic functions associated with the communication. For example, the processor 106 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 108 thus may also include the functionality to encode messages and/or data or information. The processor 106 may include, among other things, a clock, an arithmetic logic unit (ALU) and logic gates configured to support operation of the processor 106. Further, the processor 106 may include functionality to execute one or more software programs, which may be stored in the memory 104 or otherwise accessible to the processor 108.

The memory 104, may store any number of pieces of information, and data, used by the system 100 to implement the functions of the system 100. The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 108 causes the system 100 to behave in a manner as described in various embodiments.

The communication interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the communication interface (s) 108 may include one or more ports. One or more functionalities of the system 100 and components thereof, is further explained in detail with respect to block diagram described in FIG. 2.

Figure 2:
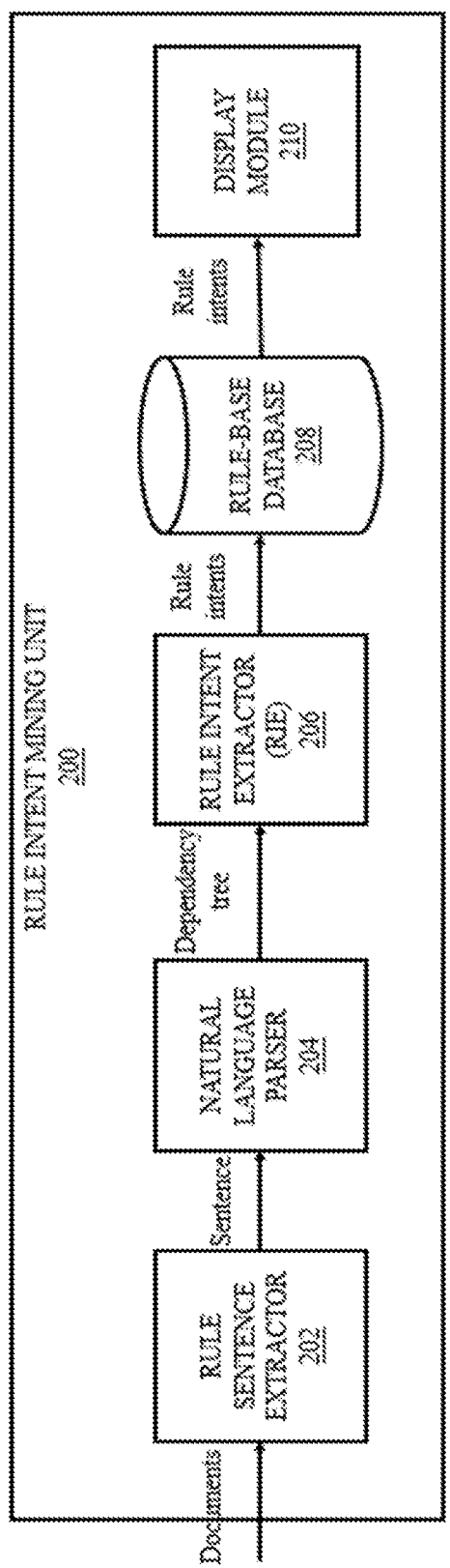
FIG. 2 is a functional block diagram of various modules stored in rule intent mining unit 102 of the system of FIG. 1 in accordance with some embodiments of the present disclosure.

FIG. 2, with reference to FIG. 1, is a functional block diagram of rule intent mining unit 108 of the system 100 of FIG. 1 in accordance with an embodiment of the present disclosure. In an embodiment of the present disclosure, the rule intent mining unit 108 comprises of various modules that include a rule sentence extractor 202 for extracting a plurality of sentences from the documents as an input, a natural language parser 204 for creating a dependency tree for each of the received plurality of sentences, a rule intent extractor (RIE) 206 for extracting a plurality of arguments from the dependency tree based on a plurality of heuristic rules and analyzing the extracted plurality of arguments to mine rule intents, a rule-base database 208 saving the mined rule intents and a display module 210 for displaying saved mined rule intents that are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the rule intent mining unit 102 within system 100 comprises the rule sentence extractor 202 that is configured for extracting a plurality of sentences from the documents as an input. The input documents can be structured or unstructured, written in natural language and comprise of plurality of input sentences along with noise components. The plurality of input sentences in the received input documents are processed to extract plurality of rule sentence by segregating rule sentence from noise based on learning models across different domains, wherein based on the domain of the input document, the corresponding learning model is applied to extract plurality of rule sentence. Further each domain specific learning model is trained on multiple language models that include rule sentence training and noise sentence training based on known techniques that include trigram language model.

According to an embodiment of the disclosure, the rule intent mining unit 102 within system 100 further comprises the natural language parser 204 that is configured for creating a dependency tree for each of the extracted plurality of rule sentences. The dependency tree is created for each of the extracted plurality of rule sentences based on known parser techniques that includes Stanford Dependency Parser.

According to an embodiment of the disclosure, the rule intent mining unit 102 within system 100 further comprises the rule intent extractor (RIE) 206 that is configured for extracting a plurality of arguments from the dependency tree based on a plurality of heuristic rules and analyzing the extracted plurality of arguments to mine rule intents. The disclosure proposes to express rule intents based on 'S' which is the string representing the predicate of the intent, 'H' which is the head word, which is the main word of the dependency tree and A which is the collections of arguments.

Further the argument (A) is extracted from corresponding dependency tree of rule sentence based on proposed plurality of heuristic rules. An argument (A) comprises of comprise of multiple attributes including value and role attributes wherein a role attribute captures association of an attribute with the concerned rule intent and can hold multiple values such as subject, object, pSubject (prepositional subject), pObject (prepositional object), objective (when a rule intent become argument to another then the role of the previous one is marked as argument). Hence the plurality of arguments are extracted and are further analyzed to mine of rule intents from dependency tree in multiple stages based on a plurality of rules that are dynamically applied based on dependency tree. In an embodiment in the first stage, subject and object for each rule is detected. Further in second stage, the prepositional arguments are detected. Further in third stage, the objective arguments are extracted with the help of rule intents detected in the first stage and in the fourth stage, a negation of a rule intent is handled, wherein a rule intent may be split into multiple rule intents based on argument type and count.

According to an embodiment of the disclosure the first stage of mining of rule intents includes detection of subject and object edges/rule intents from the dependency tree corresponding to the rule sentence based on proposed subject/object heuristic rules. The subject/object heuristic rules are performed before performing any other rules. The subject/object heuristic rules ($R_1$ to $R_8$) are described below;

$$\forall\ c_i\ nsubj(p, c_i) \rightarrow \begin{cases} R(p \cdot \text{word}, p, \{a\}) \text{ where} \\ a \cdot \text{value} = c_i \wedge a \cdot \text{role} = \text{subject if}: i = 1 \\ R(*, p, A \cup \{a\}) \text{ where} \\ a \cdot \text{value} = c_i \wedge a \cdot \text{role} = \text{subject if}: i > 1 \end{cases} \quad (R_1)$$

$$\forall c_i \; nsubjpass(p, c_i) \rightarrow \begin{cases} R(\text{'do'} + p \cdot \text{word}, p, \{a\}) \text{where} \\ a \cdot \text{value} = c_i \wedge a \cdot \text{role} = \text{subject if}: i = 1 \\ R(*, p, A \cup \{a\}) \text{where} \\ a \cdot \text{value} = c_i \wedge a \cdot \text{role} = \text{subject if}: i > 1 \end{cases} \quad (R_2)$$

$$\forall c_i \; dobj(p, c_i) \rightarrow \begin{cases} R(p \cdot \text{word}, p, \{a\}) \text{where} \\ a \cdot \text{value} = c_i \wedge a \cdot \text{role} = \text{subject if}: i = 1 \\ R(*, p, A \cup \{a\}) \text{where} \\ a \cdot \text{value} = c_i \wedge a \cdot \text{role} = \text{subject if}: i > 1 \end{cases} \quad (R_3)$$

$$\forall c_i \; amod(p, c_i) \rightarrow \quad (R_4)$$
$$(R(\text{'is'} + c \cdot \text{word}, p, \{a\}) \wedge (a \cdot \text{value} = c_i \wedge a \cdot \text{role} = \text{subject}$$

$$\forall c_i \; agent(p, c_i) \rightarrow \begin{cases} R(p \cdot \text{word}, p, \{a\}) \text{where} \\ a \cdot \text{value} = c_i \wedge a \cdot \text{role} = \text{subject if}: i = 1 \\ R(*, p, A \cup \{a\}) \text{where} \\ a \cdot \text{value} = c_i \wedge a \cdot \text{role} = \text{subject if}: i > 1 \end{cases} \quad (R_5)$$

$$\forall c_i \; acomp(p, c_i) \rightarrow \begin{cases} R(p \cdot \text{word}, +c \cdot \text{word}, p, \{a\}) \text{where} \\ (a \cdot \text{value} = c_i \wedge a \cdot \text{role} = \text{object}) \text{ if}: i = 1 \\ R(*, p, A \cup \{a\}) \text{where} \\ a \cdot \text{value} = c_i \wedge a \cdot \text{role} = \text{object if}: i > 1 \end{cases} \quad (R_6)$$

$$rcomd(gp, p) \rightarrow R(*, p, \{a\}) \wedge \wedge (a \cdot \text{value} = gp \cup a \cdot \text{role} = \text{object}) \quad (R_7)$$

$$vmod(gp_i, p) \wedge postag(p, \text{'verb'}) \wedge \not\exists aux(p, \text{'TO'}) \rightarrow \quad (R_8)$$
$$R(\text{'is'} + p \cdot \text{word}, p, A \cup \{a\}) \wedge (a \cdot \text{value} = gp_i \wedge a \cdot \text{role} = \text{object})$$

Figure 4A:
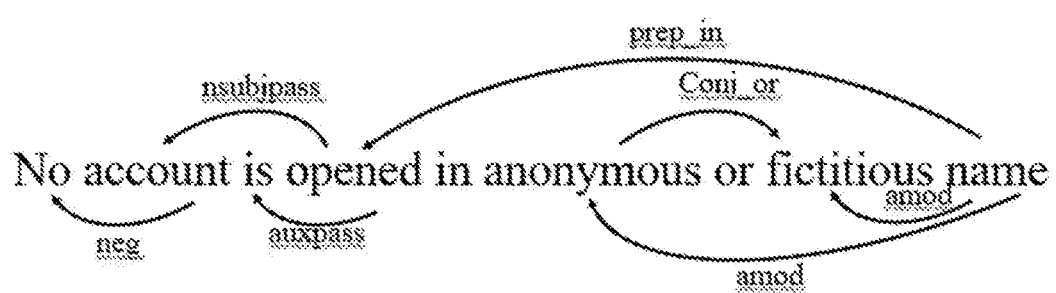

Considering a use case example of rule sentence ($rs_1$) as shown in FIG. 4A, as "No account is opened in anonymous or fictitious name", the first stage of extraction of rule intents which includes detection of subject and object rule intents from the dependency tree is performed using the rules explained above by detecting rule intents such as the predicate doOpen (open as headword) with 'account' as an argument is extracted by applying rule $R_2$. The 'account' is dependent on open with a dependency relation 'nsubjpass' (nsubjpass(opened, account)). Considering the 'amod' edge, the predicates 'isFictitious(name)' and 'isAnonymous (name)'are created by applying rule $R_4$ with head word 'name', wherein headword in each propositional rule intent is used in other group of heuristic rules for rule intent extraction as elaborated in the further method steps.

According to an embodiment of the disclosure further during the second stage of mining of rule intents prepositional arguments edges or rule intents from the dependency tree corresponding to the rule sentence is extracted based on proposed prepositional heuristic rules. The prepositional rule intents is expressed as prep_'x' (p,c) where 'x' is the preposition. The prepositional heuristic rules ($R_9$ to $R_{12}$) are described below;

$$\forall c_i \; prep\_'x'(p, c_i) \wedge postag(p,' \text{verb}') \wedge postag(c_i, '\text{noun}') \rightarrow \quad (R_9)$$
$$\begin{cases} R(p \cdot \text{word}, p, \{a\}) \wedge \\ (a \cdot \text{value} = c_i \wedge a \cdot \text{role} = pObject) \text{ if}: i = 1 \\ R(*, p, A \cup \{a\}) \\ a \cdot \text{value} = c_i \wedge a \cdot \text{role} = pObject \text{ if}: i > 1 \end{cases}$$

$$\forall c_i \; prep\_'x'(p, c_i) \wedge postag(p,' \text{verb}) \wedge postag(c_i, '\text{adjective}') \rightarrow \quad (R_{10})$$
$$\begin{cases} R(p \cdot \text{word}, p, \{a\}) \wedge \\ (a \cdot \text{value} = c_i \wedge a \cdot \text{role} = pObject) \text{ if}: i = 1 \\ R(*, p, A \cup \{a\}) \wedge \\ a \cdot \text{value} = c_i \wedge a \cdot \text{role} = pObject \text{ if}: i > 1 \end{cases}$$

$$prep\_'x'(p, c_i) \wedge postag(p,' \text{noun}') \wedge postag(c_i, '\text{noun}') \rightarrow \quad (R_{11})$$
$$R(\text{'is\_x'}, p\{a_1, a_2\}) \wedge (a_1 = p \wedge a_1 \cdot \text{role} = pSubject) \wedge (a_2 \cdot \text{value} = c_i \wedge a_2 \cdot \text{role} = pObject)$$

$$prep\_'x'(p, c_i) \wedge postag(p,' \text{adjective}') \wedge postag(c_i, '\text{noun}') \rightarrow \quad (R_{12})$$
$$R(\text{'is}_p \cdot \text{word\_x'}, p\{a\}) \wedge (a \cdot \text{value} = c_i \wedge a \cdot \text{role} = pObject)$$

Considering an use case example of rule sentence ($rs_1$) as shown in FIG. 4A, as "No account is opened in anonymous or fictitious name", by applying rule $R_2$ and rule $R_4$ from the first stage of extraction of rule intents, the subject and object rule intents are extracted from the dependency tree. The identified rule intent from first stage 'doOpen(account)' wherein the word 'open' has a 'prep in' edge to 'name'. Further the meaning conveyed by the edge is—'account is opened in name' and 'prep in' edge connects a verb (open) to a noun (name). Further on applying $R_9$ of the proposed second stage of extraction for detection of prepositional arguments edges or rule intents, the rule intent is modified as 'doOpen(account, in name)' where '(name)' is the prepositional object of the rule intent.

According to an embodiment of the disclosure further during the third stage of mining of rule intents includes detection of objective arguments rule intents using rule intents detected in first stage based on proposed objective heuristic rules. The objective heuristic rules ($R_{13}$ to $R_{15}$) are described below;

$$\forall c_i x comp(p, c_i) \wedge \exists R(S, c_i, A) \wedge \exists R(S', p, A') \rightarrow R(S', p, A \cup \{a_i\}) \wedge \quad (R_{13})$$
$$(a_i.\text{value} = R(S, c, A) \wedge a_i.\text{role} = \text{objective}) \quad \forall c_i ccomp$$
$$(p, c_i) \wedge \exists R(S, c_i, A) \wedge \exists R(S', p, A') \rightarrow R(S', p, A \cup \{a_i\}) \wedge (a_i.\text{value} = R(S, c, A) \wedge a_i.\text{role} = \text{objective}) \quad (R_{14})$$

$$\forall c_i v \quad mod(p, c) \wedge \exists R(S, c, A) \wedge \exists aux(p, \text{'TO'}) \wedge \exists R(S', p, A') \rightarrow R(S', p, A' \cup \{a_i\}) \wedge (a_i.\text{value} = R(S, c, A) \wedge a_i.\text{role} = \text{objective}) \quad (R_{15})$$

Considering an use case example of rule sentence ($rs_2$) as "If the ordering bank fails to furnish information on the remitter, the beneficiary bank should consider restricting or even terminating its business relationship with the ordering bank.", the dependency tree, would be expressed as shown in FIG. 4B. The objective is 'furnish information on remitter' is accomplished by 'bank fails' and the appropriate rule intent for this statement can be represented as—'fails (bank, furnish (information, on remitter))'. Further the rule $R_{13}$ is applied as a dependency exists for two verbs (fails, furnish) with xcomp, however in this example, the dependency tree is traversed in level-order fashion and relevant primitive rules ($R_1$, $R_3$) and prepositional rule ($R_9$) are applied before rule $R_{13}$. As a result the rule intent $ri_5$ will be added as an argument to rule intent 'fails (bank)' as shown in FIG. 4A to FIG. 4D.

According to an embodiment of the disclosure further during the fourth stage of mining of rule intents includes splitting rules where the rule intent has more than one subject or object. The proposed splitting heuristic rules ($R_{16}$ to $R_{17}$) are described below;

let $\{A_{role_k} \subset A | \forall_{i,j}, a_i, a_j \in A_{role_k} \wedge (a_i.\text{role}=a_j.\text{role}=a_k.\text{role})$ where $i \neq j\}$ then if $R(S,H,A) \wedge (|A_{role_k}| \geq 2)$, then $\forall_a \in A_{role_k}(R(S,H,A^a)$
$|A^a|=(\{a\} \cup (A-A_{role_k}))$  (R$_{16}$)

$\forall c_i \text{conj}_{x'(p,c_i)} \wedge \text{postag}(p,' \text{verb}') \wedge \text{postag}(c_i,'\text{verb}') \wedge ($
$\exists r | \in \{p,c_i\}, \text{degree}(r) \not> 1) \wedge \exists R(S\{p,c_i\}-r,A) \rightarrow R(r.\text{word},r,A)$  (R$_{17}$)

Figure 4C:
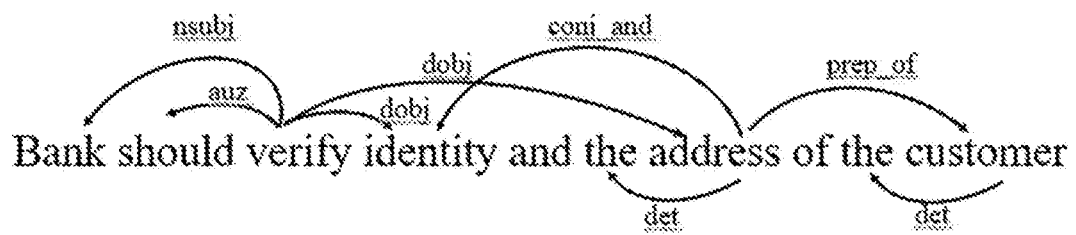
Figure 4D:
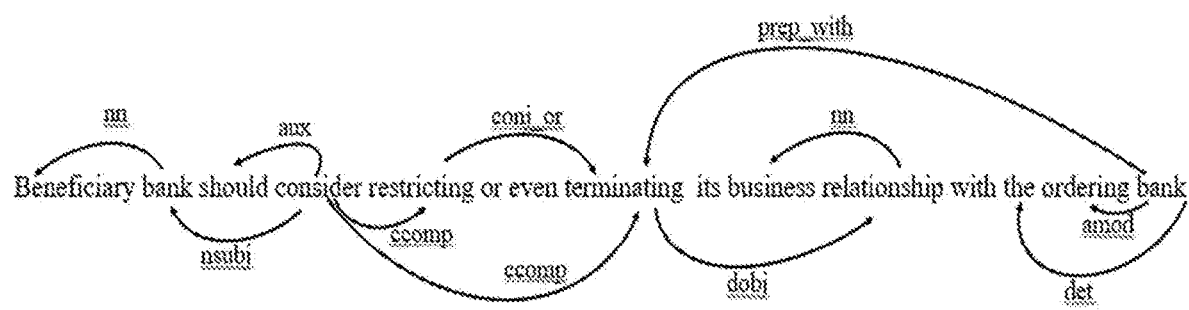

Considering an use case example of rule sentence (rs$_4$) as "Bank should verify identity and the address of the customer.", the dependency tree, would be expressed as shown in FIG. 4C. The subject/object rules R$_1$ and R$_3$ are applied at the first stage of rule intent extraction to get the predicate 'verify(bank, identity, address)'. Ideally, the above predicate should be split into 'verify(bank, identity)' and 'verify(bank, address)' to make it more meaningful. Further considering an use case example of rule sentence (rs$_2$) as "If the ordering bank fails to furnish information on the remitter, the beneficiary bank should consider restricting or even terminating its business relationship with the ordering bank.", the dependency tree, would be expressed as shown in FIG. 4D. In this, 'restricting', 'terminating' are connected with edge 'conj or'. 'Conjunction' edges are denoted by 'conj <x>' where 'x' is that particular conjunction. In the example, the 'or' conjunction is used and both the verbs share the same argument however 'relationship' and 'bank' are directly connected to 'terminating', they are not directly connected with 'restricting', hence the node with 'restricting' will not satisfy any of the rules R$_1$ to R$_{15}$. Further an ideal rule intent 'terminating (with bank, relationship)' is preferred hence the rule intent 'restricting(with bank, relationship)' can be extracted on applying R$_{17}$. Further if an edge conj 'x' (p; ci) exists then a node r is chosen from fp; cig with which a rule intent cannot be created. In the earlier scenario, the word 'restricting' is chosen and a rule intent with this node r created by copying the arguments from a node other than r from fp.

According to an embodiment of the disclosure further the fifth stage of mining of rule intents includes negating the rule intent. The proposed negation heuristic rules (R$_{18}$ to R$_{20}$) are described below;

$\text{neg}(p,c) \wedge \exists R(S,p,A) \rightarrow R(\text{null},p,\emptyset) \wedge \text{markNegate}(R(\text{null},p,\emptyset))$  (R$_{18}$)

Now let $R=\{R(S',gp,A')|gp$ is parent of $p\}$ $\text{markNegate}(R(\text{null},p,\emptyset)) \wedge \text{postag}(p,' \text{verb}')$
$\wedge R \neq \emptyset \rightarrow \forall_r \in R \text{markNegate}(r)$  (R$_{19}$)

$\text{neg}(p,c) \wedge \exists R(S,p,A) \rightarrow \text{markNegate}(R(S,p,A))$  (R$_{20}$)

The negation rules performs 'neg' edge and marks a rule intent in negated form by using the function 'markNegated'. These rules also check for rule intent with source of the neg edge as head. In case of existence rule intent with source of the neg edge as head the rule intent is marked as negated (R$_{20}$) while in case of absences of neg edge as head, a dummy rule intent is created with a null as predicate and argument (R$_{18}$). The rule R$_{19}$ is applied to on dummy rule intents after creating rule intents from all other nodes by applying rules R$_1$ to R$_{17}$. The rule R$_{19}$ checks for the existence of rule intent with the grand parent word as head and marks that rule intent negated. All the dummy intents will be discarded at the end.

Considering an use case example of rule sentence (rs$_1$) as shown in FIG. 4A, as "No account is opened in anonymous or fictitious name", the 'neg'edge between 'account' to 'No' create a dummy rule intent with 'account'. The parent of 'account' is 'opened' and there exists a rule intent 'doOpen (account,in name)'. The intent is marked as ':doOpen(account,in name)' by applying R$_{19}$.

Hence as described above plurality of arguments are successfully extracted in multiple stages based on proposed heuristic rules, wherein the proposed heuristic rules are implemented based on machine learning techniques.

Further the extracted plurality of arguments are analyzed to mine rule intents in a rule intent extractor (206). The rule intents are mined using extracted plurality of arguments (A) along with multiple parameters that include string (S) and headword (H) parameters expressed as Rule intent(ri)=R(S, H, A), which is in SBVR format.

According to an embodiment of the disclosure, the rule intent mining unit 102 within system 100 further comprises the rule-base database (208) that is configured for saving the mined rule intents in SBVR format. The Table.1 below illustrates an use case examples, wherein the rule intents (ri$_n$) mined based on proposed heuristic rules for rule sentences rs$_1$, rs$_2$, rs$_3$ and rs$_4$ respectively are displayed, according to an embodiment of present disclosure;

| Rule Sentence | Rule Intents |
|---|---|
| rs$_1$ | ri$_1$ is Anonymous(name) |
| | ri$_2$ is Fictitious(name) |
| | ri$_3$ is doOpen(account, in name) |
| rs$_2$ | ri$_4$ is Ordering(bank) |
| | ri$_5$ furnish(information, remitter) |
| | ri$_6$ fails (bank, furnish(information, remitter)) |
| | ri$_7$ terminating (relationship[business], with bank) |
| | ri8 restricting (relationship[business], with bank) |
| | ri$_9$ consider(bank[beneficiary], terminating (relationship [business], with bank relationship [business], with bank)) |
| rs$_3$ | ri$_{10}$ is Fresh(proof) |
| | ri$_{11}$ is Mentioned(address, per proof) |
| | ri$_{12}$ undergoes(address, change) |
| | ri$_{13}$ is-of(proof, address) |
| | ri$_{14}$ do Submit(proof, branch) |
| | ri$_{15}$ is-of(period, months([six])) |
| rs$_4$ | ri$_{16}$ is-of(customer, address) |
| | ri$_{17}$ verify(bank, address) |
| | ri$_{18}$ verify(bank, identity) |

Mined rule intents for rule sentences 1

According to an embodiment of the disclosure, the rule intent mining unit 102 within system 100 further comprises the display module (210) that is configured for displaying saved mined rule intents in SBVR format. The mined rule intents that are displayed automatically in the SBVR format can be easily analyzed as they SBVR is a comprehensive standard for business rule representation by Object Management Group (OMG) in accordance with set of a standard pre-defined vocabularies.

Figure 3:
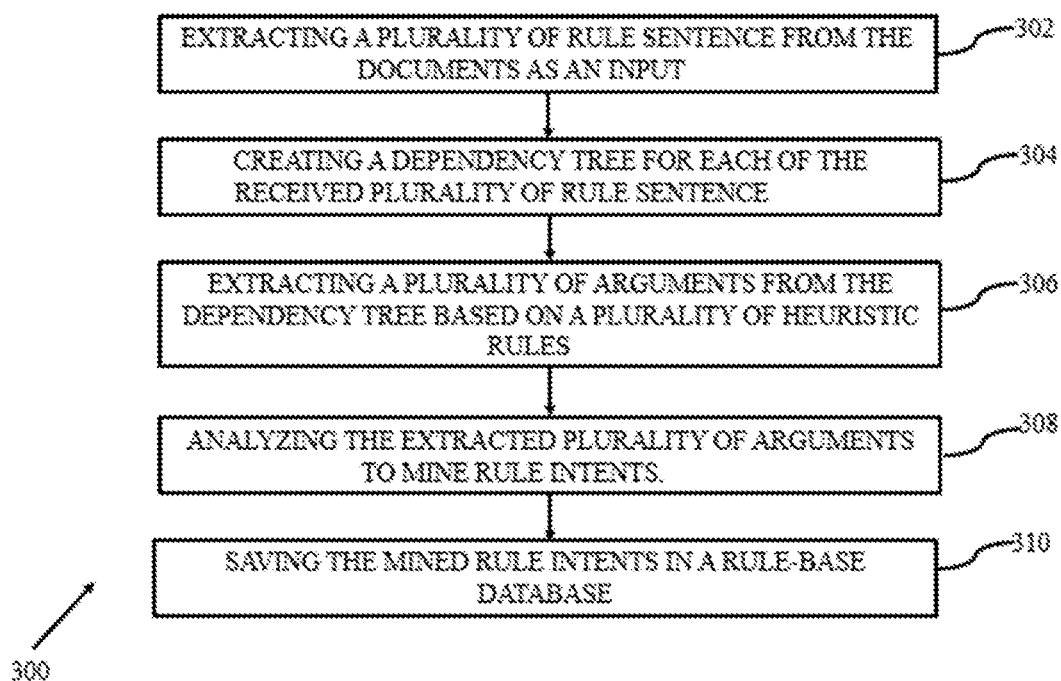
FIG. 3 a flow diagram illustrating a method for mining of rule intents from documents, according to an embodiment of present disclosure.

FIG. 3, with reference to FIGS. 1-2, is an exemplary flow diagram 300 illustrating a method for mining rule intents from documents using the system 100 of FIG. 1 according to an embodiment of the present disclosure. In an embodiment, the system 100 comprises one or more data storage devices or the memory 104 operatively coupled to the one or more processors 108 and is configured to store instructions for execution of steps of the method by the rule intent mining unit 108. The steps of the method of the present disclosure will now be explained with reference to the components of the system 100 and the modules 202-210 as depicted in FIGS. 1-2, and the flow diagram as depicted in FIG. 3.

At step 302, extracting a plurality of rule sentence from the documents as an input to the rule sentence extractor (202). The input documents can be structured or unstructured, written in natural language and comprises of plurality of input sentences along with noise components. The plurality of input sentences in the received input documents are processed to extract plurality of rule sentence by segregating rule sentence from noise based on learning models across different domains.

At step 304, a dependency tree is created for each of the extracted plurality of rule sentence in the natural language parser (204). The dependency tree is created for each of the extracted plurality of rule sentences based on known parser techniques that includes Stanford Dependency Parser.

At step 306, a plurality of arguments (A) are extracted from the created dependency tree based on a plurality of heuristic rules in a rule intent extractor (206). The plurality of arguments comprise of multiple attributes including value and role attributes, wherein the role attributes hold multiple values that include subject, object, preposition, split and negation. The plurality of arguments are extracted based on processing plurality of heuristic rules for individual role attribute of nodes (n) and edges of dependency tree.

At step 308, the extracted plurality of arguments are analyzed to mine rule intents in a rule intent extractor (206). The rule intents are mined using extracted plurality of arguments (A) along with multiple parameters that include string (S) and headword (H) parameters.

At step 310, the mined rule intents are saved in the rule-base database (208). The mined rule intents are saved in rule-base database (208) as vocabularies in Semantics of Business Vocabulary and Rules (SBVR) format. Further the saved mined rule intents are displayed on the display module (210) in saved SBVR format.

The illustrated steps of method 300 are set out to explain the exemplary embodiments shown, and it should be anticipated that ongoing technological development may change the manner in which particular functions are performed. These examples are presented herein for purposes of illustration, and not limitation.

Hence a method and system for mining rule intents from documents is provided, wherein the rule intents are basic atomic facts present in a sentence. The proposed method and system for mining of rule intents from documents is performed in multiple stages that include analyzing dependency trees of plurality sentences of input documents based on a set of plurality of heuristic rules. The mined rule intents are saved and further displayed in Semantics of Business Vocabulary and Rules (SBVR) format. The mined rule intents that are displayed automatically in the SBVR format can be easily analyzed as they SBVR is a comprehensive standard for business rule representation by Object Management Group (OMG) in accordance with set of a standard pre-defined vocabularies.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for mining rule intents from documents, the method comprising:
   extracting a plurality of rule sentences from the documents as an input, wherein the documents are written in natural language and contains noise, wherein the plurality of rule sentences are extracted by segregating rule sentences from the noise based on learning models across different domains, and wherein based on domain of a document, a corresponding domain specific learning model is automatically applied to extract the plurality of rule sentences;
   creating a dependency tree for each of the extracted plurality of rule sentences;
   extracting and analyzing a plurality of arguments from the dependency tree based on a plurality of heuristic rules in multiple stages to mine rule intents, wherein the plurality of arguments comprises of multiple attributes including value and role attributes, wherein the role attributes hold multiple values that include subject, object, preposition, objective, split and negation, and wherein the multiple stages comprises i) a first stage, in which subject and object rule intents for each rule sentence are detected based on subject/object heuristic rules of the plurality of heuristic rules, ii) a second stage, in which prepositional rule intents are detected based on prepositional heuristic rules of the plurality of heuristic rules, iii) a third stage, in which objective rule intents are detected using rule intents detected in the first stage based on objective heuristic rules of the plurality of heuristic rules, iv) a fourth stage, in which a rule intent having more than one subject or object is split into multiple rule intents based on splitting heuristic rules of the plurality of heuristic rules, and v) a fifth stage, in which rule intents are negated based on negation heuristic rules of the plurality of heuristic rules;
   and
   saving the mined rule intents in a rule-base database.

2. The method of claim 1, wherein the documents comprising the plurality of rule sentences are structured or unstructured documents.

3. The method of claim 1, wherein the dependency tree is created for each of the extracted plurality of sentences based on parser techniques that includes Stanford Dependency Parser.

4. The method of claim 1, wherein the plurality of heuristic rules are performed individually for each role attribute based on nodes and edges of dependency tree.

5. The method of claim 1, wherein the rule intents are mined using extracted plurality of arguments (A) along with multiple parameters that include string (S) and headword (H) parameters.

6. The method of claim 1, wherein the mined rule intents are saved as vocabularies in Semantics of Business Vocabulary and Rules (SBVR) format.

7. A system comprising:
   a rule intent mining unit (102) for mining rule intents from documents;
   a memory (104) for storing instructions;
   one or more communication interfaces (106);
   one or more hardware processors (108) communicatively coupled to the memory using the one or more communication interfaces, wherein the one or more hardware processors are configured by the instructions to execute one or more modules of the rule intent mining unit (102) comprising:
   a rule sentence extractor (202) for extracting a plurality of sentences from the documents as an input, wherein the documents are written in natural language and contains noise, wherein the plurality of rule sentences are extracted by segregating rule sentences from the noise based on learning models across different domains, and wherein based on domain of a document, a corresponding domain specific learning model is automatically applied to extract the plurality of rule sentences;
   a natural language parser (204) for creating a dependency tree for each of the extracted plurality of rule sentences;
   a rule intent extractor (206) for extracting a plurality of arguments from the dependency tree based on a plurality of heuristic rules and analyzing the extracted plurality of arguments to mine rule intents in multiple stages, wherein the plurality of arguments comprises of multiple attributes including value and role attributes, wherein the role attributes hold multiple values that include subject, object, preposition, objective, split and negation, and wherein the multiple stages comprises i) a first stage, in which subject and object rule intents for each rule sentence are detected based on subject/object heuristic rules of the plurality of heuristic rules, ii) a second stage, in which prepositional rule intents are detected based on prepositional heuristic rules of the plurality of heuristic rules, iii) a third stage, in which objective rule intents are detected using rule intents detected in the first stage based on objective heuristic rules of the plurality of heuristic rules, iv) a fourth stage, in which a rule intent having more than one subject or object is split into multiple rule intents based on splitting heuristic rules of the plurality of heuristic rules, and v) a fifth stage, in which rule intents are negated based on negation heuristic rules of the plurality of heuristic rules;
   a rule-base database (208) saving the mined rule intents; and
   a display module (210) for displaying the saved mined rule intents.

8. The system of claim 7, wherein the mined rule intents are saved and displayed on the display module (210) in Semantics of Business Vocabulary and Rules (SBVR) format.

9. One or more non-transitory machine readable information storage mediums comprising one or more instructions which when executed by one or more hardware processors cause:
   extracting a plurality of rule sentences from documents as an input, wherein the documents are written in natural language and contains noise, wherein the plurality of rule sentences are extracted by segregating rule sentences from the noise based on learning models across different domains, and wherein based on domain of a document, a corresponding domain specific learning model is automatically applied to extract the plurality of rule sentences;
   creating a dependency tree for each of the extracted plurality of rule sentences;
   extracting and analyzing a plurality of arguments from the dependency tree based on a plurality of heuristic rules in multiple stages to mine rule intents, wherein the plurality of arguments comprises of multiple attributes including value and role attributes, wherein the role attributes hold multiple values that include subject, object, preposition, objective, split and negation, and wherein the multiple stages comprises i) a first stage, in which subject and object rule intents for each rule sentence are detected based on subject/object heuristic rules of the plurality of heuristic rules, ii) a second stage, in which prepositional rule intents are detected based on prepositional heuristic rules of the plurality of heuristic rules, iii) a third stage, in which objective rule intents are detected using rule intents detected in the first stage based on objective heuristic rules of the plurality of heuristic rules, iv) a fourth stage, in which a rule intent having more than one subject or object is split into multiple rule intents based on splitting heuristic rules of the plurality of heuristic rules, and v) a fifth stage, in which rule intents are negated based on negation heuristic rules of the plurality of heuristic rules;

and saving the mined rule intents in a rule-base database.

* * * * *